United States Patent
Hagen

(10) Patent No.: US 9,303,493 B2
(45) Date of Patent: Apr. 5, 2016

(54) METHOD AND APPARATUS FOR STRAIN RELIEF IN THERMAL LINERS FOR FLUID TRANSFER

(75) Inventor: David L. Hagen, Goshen, IN (US)

(73) Assignee: VAST POWER PORTFOLIO, LLC, Elkhart, IN (US)

( * ) Notice: Subject to any disclaimer, the term of this patent is extended or adjusted under 35 U.S.C. 154(b) by 1182 days.

(21) Appl. No.: 13/319,738

(22) PCT Filed: May 17, 2010

(86) PCT No.: PCT/US2010/035161
§ 371 (c)(1),
(2), (4) Date: Nov. 10, 2011

(87) PCT Pub. No.: WO2010/132894
PCT Pub. Date: Nov. 18, 2010

(65) Prior Publication Data
US 2012/0048416 A1 Mar. 1, 2012

Related U.S. Application Data

(60) Provisional application No. 61/216,260, filed on May 15, 2009.

(51) Int. Cl.
*E21B 43/08* (2006.01)
*B01D 29/48* (2006.01)

(52) U.S. Cl.
CPC .............. *E21B 43/086* (2013.01); *B01D 29/48* (2013.01); *E21B 43/088* (2013.01); *Y10T 137/8085* (2015.04)

(58) Field of Classification Search
CPC ..... E21B 43/086; E21B 43/088; B01D 29/48; Y10T 137/8085
USPC ................. 137/549; 166/50, 227, 242.1, 303; 210/497.1, 497.01
See application file for complete search history.

(56) References Cited

U.S. PATENT DOCUMENTS

| 65,276 A | 5/1867 | Ricker | 175/19 |
| 1,207,808 A | 12/1916 | Steps | 72/203 |

(Continued)

FOREIGN PATENT DOCUMENTS

| RU | 2 037 566 | 6/1995 |
| RU | 2 339 809 | 11/2008 |

OTHER PUBLICATIONS

International Search Report and Written Opinion mailed Jul. 13, 2010 in corresponding PCT International Application No. PCT/US2010/035161.

(Continued)

*Primary Examiner* — Atif Chaudry
(74) *Attorney, Agent, or Firm* — OSTROLENK FABER LLP

(57) ABSTRACT

A method of forming a slotted liner, having a wall comprising a plurality of non-axial bending members axially separated by non-axial slots and circumferentially interspersed with bases, for providing strain relief, the method comprising: forming the bending members and the non-axial slots by one of: cutting non-axial slots, and winding a rod; configuring the circumferential lengths of the plurality of non-axial slots and bases relative to the liner circumference; wherein positioning a first base axially adjacent to a non-axial slot; configuring the non-axial slot circumferential length longer than the circumferential length of the first base; and positioning a second base axially adjacent to a first base; providing connections between the pair of bases or leaving uncut the wall between the base pair; configuring the plurality of non-axial slots and adjacent base pairs.

33 Claims, 7 Drawing Sheets

(56) References Cited

U.S. PATENT DOCUMENTS

Figure 1:
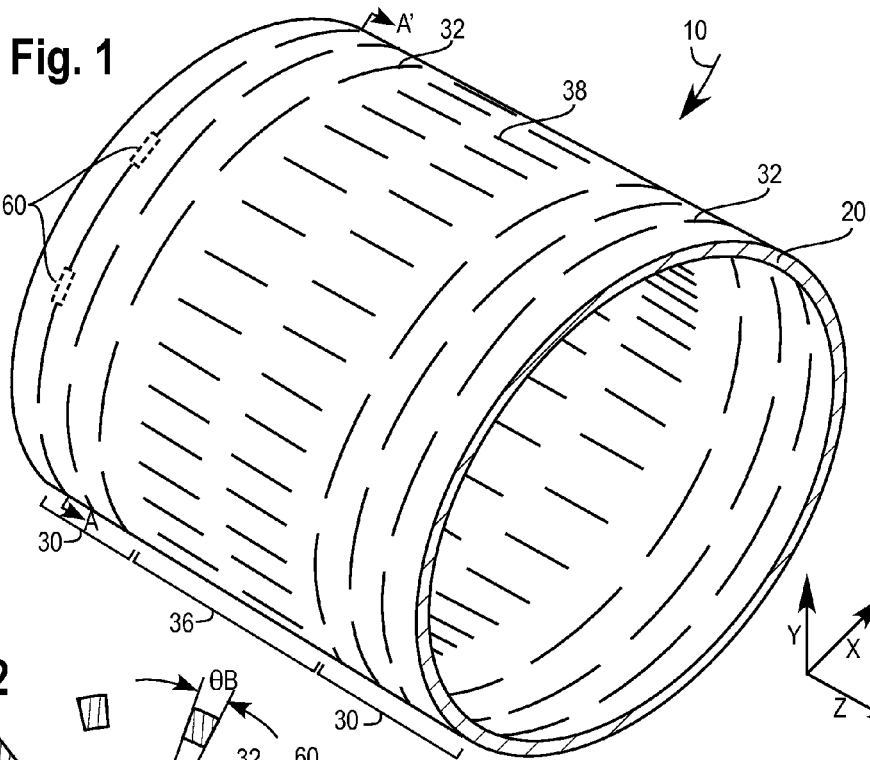

| | | | |
|---|---|---|---|
| 1,620,412 A | 3/1927 | Tweeddale | 166/203 |
| 1,652,208 A | 12/1927 | McEvoy | 72/324 |
| 3,330,361 A * | 7/1967 | McCullough | 166/227 |
| 3,709,293 A | 1/1973 | Layne et al. | 166/232 |
| 3,750,444 A | 8/1973 | Bittner | 72/78 |
| 3,754,651 A | 8/1973 | Lannoch | 210/106 |
| 3,937,281 A | 2/1976 | Harnsberger | 166/233 |
| 3,973,311 A | 8/1976 | Harnsberger | 29/434 |
| 4,249,292 A | 2/1981 | Calderon | 29/896.61 |
| 4,312,207 A | 1/1982 | Przybyla et al. | 72/100 |
| 4,640,359 A | 2/1987 | Livesey et al. | 166/276 |
| 5,095,990 A | 3/1992 | Best et al. | 166/369 |
| 5,152,892 A | 10/1992 | Chambers | 210/493.4 |
| 5,240,074 A | 8/1993 | Peavy et al. | 166/286 |
| 5,413,175 A | 5/1995 | Edmunds | 166/252 |
| 5,551,513 A | 9/1996 | Surles et al. | 166/278 |
| 5,642,781 A | 7/1997 | Richard | 166/231 |
| 5,785,122 A | 7/1998 | Spray | 166/227 |
| 5,901,789 A | 5/1999 | Donnelly et al. | 166/381 |
| 5,924,745 A | 7/1999 | Campbell | 285/90 |
| 5,938,925 A | 8/1999 | Hamid et al. | 210/497.1 |
| 5,957,205 A | 9/1999 | Bohme et al. | 166/296 |
| 6,012,522 A | 1/2000 | Donnelly | 166/276 |
| 6,021,905 A | 2/2000 | Frejborg | 209/411 |
| 6,073,659 A * | 6/2000 | Lange | 138/177 |
| 6,112,570 A | 9/2000 | Hruschak | 72/370.27 |
| 6,125,932 A | 10/2000 | Hamid et al. | 166/233 |
| 6,315,040 B1 | 11/2001 | Donnelly | 166/207 |
| 6,382,318 B1 | 5/2002 | Whitlock | 166/278 |
| 6,553,038 B1 | 4/2003 | Fukuda | 370/465 |
| 6,571,672 B1 | 6/2003 | Rudd | 83/36 |
| 6,698,595 B2 | 3/2004 | Norell et al. | 210/499 |
| 6,715,544 B2 | 4/2004 | Gillespie et al. | 166/230 |
| 6,722,443 B1 | 4/2004 | Metcalfe | 166/384 |
| 6,761,270 B2 | 7/2004 | Carew | 210/352 |
| 6,799,637 B2 | 10/2004 | Schetky et al. | 166/384 |
| 6,898,957 B2 | 5/2005 | Slack | 72/122 |
| 6,904,974 B2 * | 6/2005 | Slack | 166/384 |
| 7,069,657 B2 | 7/2006 | Culp et al. | 29/896.61 |
| 7,073,366 B2 | 7/2006 | Hruschak et al. | 72/320.27 |
| 7,093,653 B2 | 8/2006 | Metcalfe et al. | 166/230 |
| 7,100,686 B2 | 9/2006 | Wittrisch | 166/227 |
| 7,146,835 B2 | 12/2006 | Hruschak et al. | 72/7.1 |
| 7,188,687 B2 | 3/2007 | Rudd et al. | 175/171 |
| 7,380,840 B2 | 6/2008 | Sivley et al. | 285/334 |
| 7,578,343 B2 | 8/2009 | Augustine | 166/227 |
| 7,845,407 B2 | 12/2010 | Bunnell et al. | 166/278 |
| 7,861,788 B2 | 1/2011 | Tips et al. | 166/319 |
| 7,922,637 B2 | 4/2011 | Motokawa et al. | 492/56 |
| 8,056,627 B2 | 11/2011 | Johnson et al. | 166/272.3 |
| 2002/0108478 A1 | 8/2002 | Klimack et al. | 83/54 |
| 2004/0253058 A1 | 12/2004 | Eck | 405/184.4 |
| 2005/0028658 A1 | 2/2005 | Klimack et al. | 83/54 |
| 2005/0269084 A1 | 12/2005 | Klimack et al. | 166/255.3 |
| 2007/0044957 A1 * | 3/2007 | Watson et al. | 166/245 |
| 2007/0215346 A1 | 9/2007 | Sloan et al. | 166/250.01 |
| 2008/0093079 A1 | 4/2008 | Bryant et al. | 166/313 |
| 2009/0014174 A1 * | 1/2009 | Hollies | 166/228 |
| 2010/0126720 A1 | 5/2010 | Kaiser et al. | 166/268 |
| 2010/0243239 A1 | 9/2010 | Furui et al. | 166/233 |
| 2011/0146831 A1 | 6/2011 | Tooker et al. | 138/177 |

OTHER PUBLICATIONS

Doug Hollies, "Sand Control Options and Operator Experience in SAGD and Other Thermal Applications," Jan. 29, 2009, Codec Oilsands Engineering Inc. Retrieved on Jul. 1, 2009 from Internet, URL address: <http.//www.choa.ab.ca/pdf/09Jan29BC-slides.pdf>.

V. Mishra, "A Model for Matrix Acidizing of Long Horizontal Well in Carbonate Reservoirs"—*Thesis submitted to Texas A&M University*, (Aug. 2007).

D. Bennion et al., "Protocols for Slotted Liner Design for Optimum SAGD Operation", *Petroleum Society, Canadian International Petroleum Conference*, pp. 1-13 (Jun. 2008).

K. Furui, "A Comprehensive Skin Factor Model for Well Completions Based on Finite Element Simulations", *Dissertation submitted to Texas A&M University*, May 2004.

J. Xie et al., "Slotted liner design for SAGD wells", *World Oil*, pp. 67-75 (Jun. 2007).

G. Woiceshyn et al., "Mechanical Evaluation of a New Sand Control Screen for SAGD", *Canadian Heavy Oil Association, Petroleum Society*, SPE/PS/CHOA 117486, (Oct. 2008).

K. Hamilton et al., "Full-Scale Testing of a New Sand Control Screen for SAGD Applications", *World Heavy Oil Congress*, pp. 1-10 (2009).

Y. Tang, "Optimization of Horizontal Well Completion", *Dissertation submitted to Texas A&M University*, (May 2001).

Kazakhstan Office Action received Jul. 3, 2013 issued in Kazakhstan Application No. 2011/1637.1 (including English translation).

Russian Office Action issued in Russian Application No. 2011151086 (including English translation).

* cited by examiner

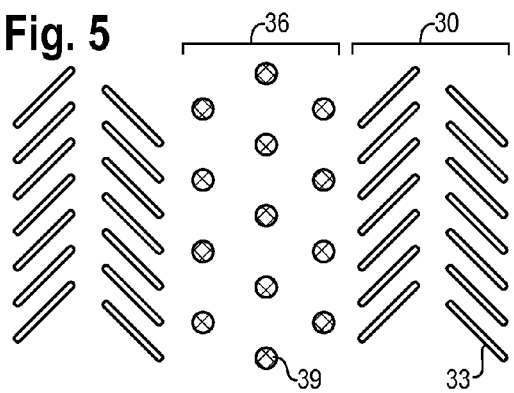
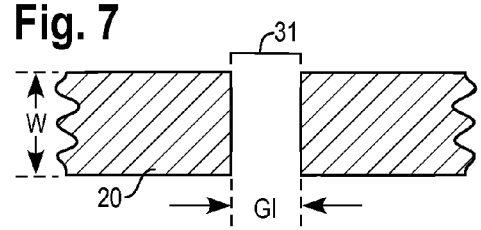
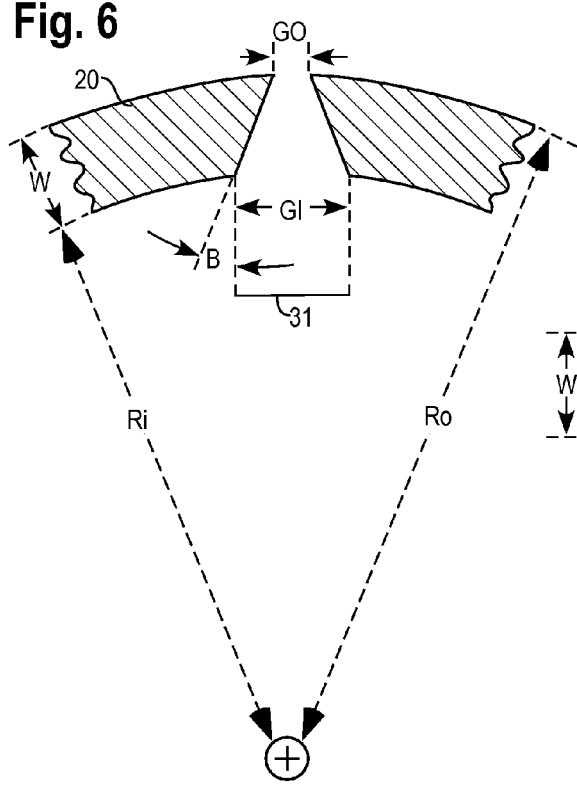
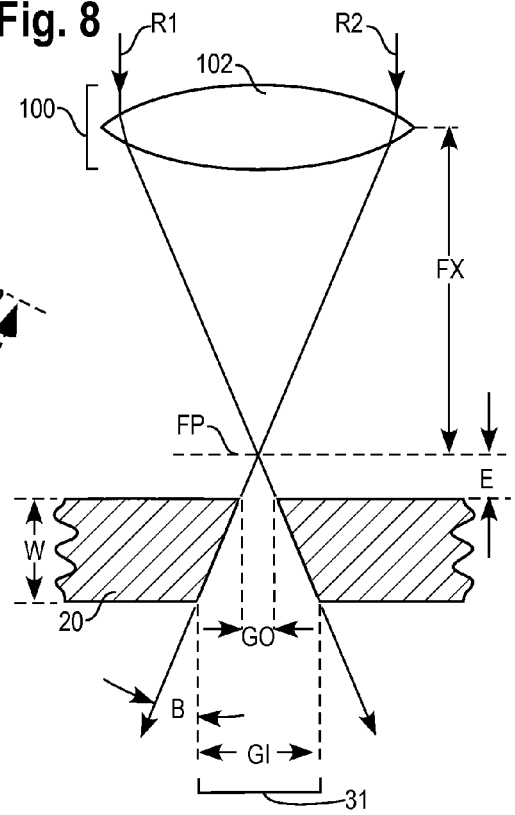

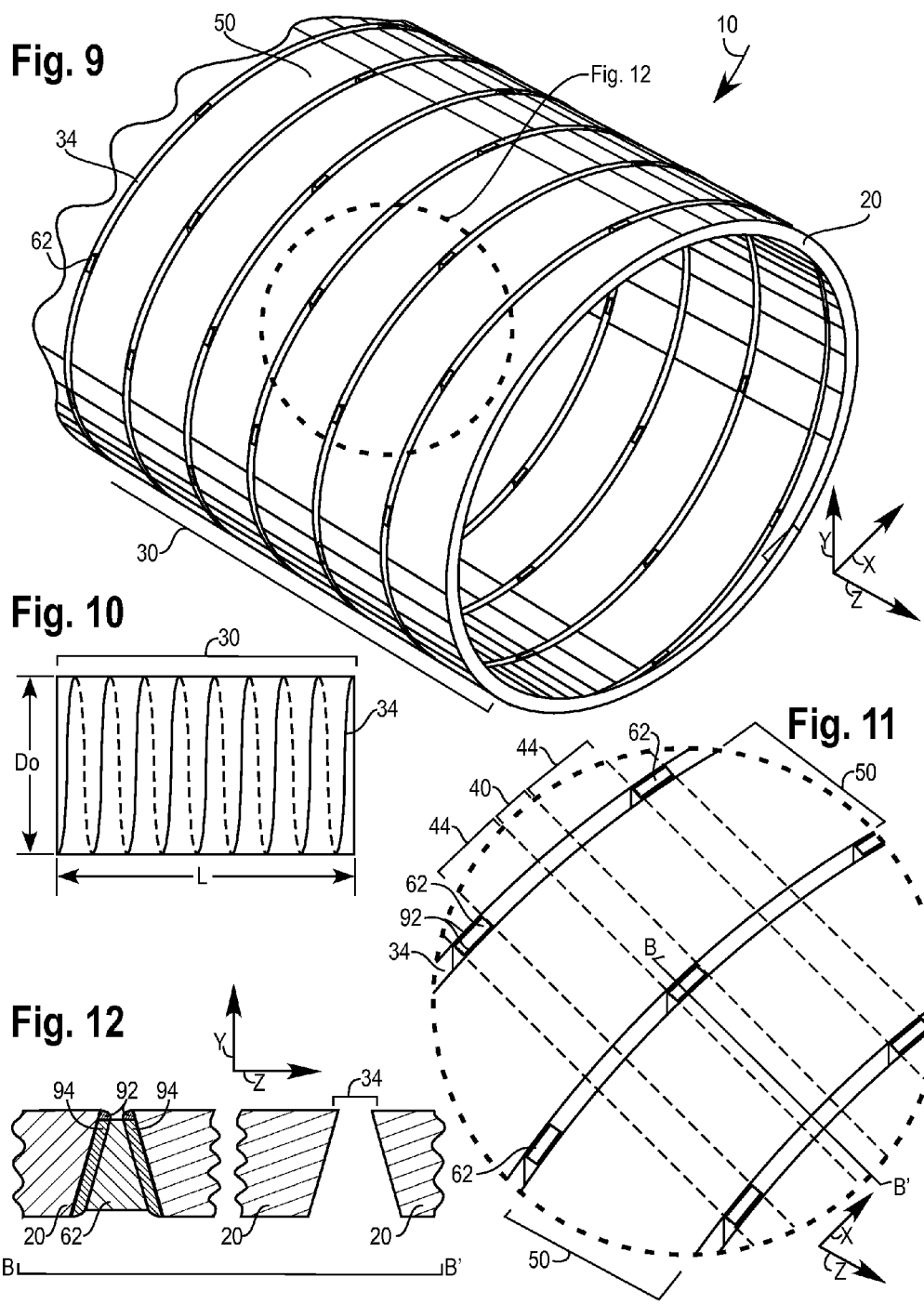

METHOD AND APPARATUS FOR STRAIN RELIEF IN THERMAL LINERS FOR FLUID TRANSFER

CROSS-REFERENCE TO RELATED APPLICATIONS

The present application is a 35 U.S.C. §§ 371 national phase conversion of PCT/US2010/035161, filed May 17, 2010, which claims priority of U.S. Provisional Application No. 61/216,260, filed May 15, 2009, the content of which is incorporated herein by reference. The PCT International Application was published in the English language.

BACKGROUND OF THE INVENTION

Field of the Invention

This invention relates to the configuration of thermal liners with strain relief for recovering or delivering fluids in heated resources.

DESCRIPTION OF RELATED ART

Background

Hydrocarbon resources, such as oil sands and heavy oil resources, are commonly heated to reduce viscosity and enhance recovery especially in temperate or polar regions. E.g., a conventional axially slotted recovery liner heated from 20° C. to 350° C. experiences a 330° C. increase in temperature, such as in Cyclic Steam Stimulation (CSS) of a heavy oil resource. This typically causes a 0.43% thermally induced expansion or strain for common metals having a coefficient of expansion about 0.0013%/K. With 600 m to 1,000 m long axially slotted recovery liners, this would cause 2.6 m to 4.3 m of unconstrained expansion, or the equivalent compressive stress when constrained in situ.

Similarly, with Steam Assisted Gravity Drainage (SAGD), axially slotted recovery liners heated from 20° C. to 290° C. experience a 270° C. temperature increase. This typically causes about 0.38% thermally induced expansion or the equivalent compressive strain from an in situ resource constraint. E.g., 2.3 m to 3.8 m strain for 600 m to 1,000 m long slotted recovery liners. Colder locations would experience even higher temperature increases and thermal expansion. E.g., from sub zero ground temperatures near Ft. McMurray, Alberta, Canada.

With conventionally slotted liners installed within and constrained by a hydrocarbon resource, such thermal temperature difference causes a corresponding thermally induced compressive stress equivalent to about 0.38% to 0.43% strain. This compressive stress at design is substantially above the typical elastic design compressive stress. (e.g., above a typical elastic design stress of 0.2% to 0.3% depending on material). Heating constrained slotted liners over such temperature increases commonly results in substantial plastic deformation.

Where such axial compressive stress plus resource compressive stress exceeds a "critical" stress, it can cause buckling and/or collapse of constrained heated slotted liners. Transverse and gravitationally compressive geomechanical loads further compound the slotted liner strains and stresses. Thermal liners have failed in SAGD and CSS installations, though causes are difficult to determine. High thermally induced plastic stress is considered one of the likely causes of such failures.

Conventional "slotted liners" commonly use filter slots oriented axially with the liner axis. This maintains slot dimensions and filter properties. However, such axially slotted liners provide little axial strain relief during thermally heated hydrocarbon recovery. Sintered wire mesh disks have been pressed into circular holes in fluid recovery liners to provide filtration while recovering heavy hydrocarbon flows into the recovery liner while excluding most of the sand. However, such recovery liners apparently do not provide major relief for high thermal strain in constrained recovery liners.

Differential movement of the surrounding resource transverse to the liner can cause recovery liners to bend, dent and/or collapse. Liner bending stiffness in the face of differential ground motion is another probable cause for failure of liners.

Bellows strain relief sections having bellows folds running azimuthally around the tube have been constructed to relieve axial strain in thermal recovery liners for heavy hydrocarbon or bitumen recovery. However, such bellows are expensive, do not provide for fluid recovery, and have not been widely adopted.

Cylindrical wedge wire collection screens have been used to recover fluid from low pressure slurries such as coal slurries and vegetable mash. However, wedge wire screens are typically bonded to axially oriented reinforcing bars. These are not designed for heavy compressive loads nor for high thermal strain as experienced in SAGD or CSS thermal hydrocarbon recovery. Various expandable tubular thermal liners have been offered with screens. Again they have not been widely accepted.

Configuring liner couplings for thermal heating is seriously complicated by high plastic thermal strains. High strains can damage coupling seals in risers causing steam bypass leakage and thermal losses resulting in high steam to oil ratios (SOR). Liner tube strain can seriously damage liner couplings when they are axially weaker than the liner tube.

SUMMARY OF THE INVENTION

The invention provides methods and apparatus to relieve a portion of high thermal strain in heated thermal liners comprising filters to collect (or inject) fluids which constrain a prescribed size fraction of sand, particulates or other debris from traversing the filters. Some embodiments may form strain relief slots in liner tubulars, by removing tubular material. Other embodiments may form strain relief slots by assembling elongated components into tubulars. Such non-axially aligned slots are configured to form bending members in the thermal liner tube interspersed with and supported by base regions. The bases are circumferentially offset sufficiently for these bending members to relieve axial tubular strain caused by thermal changes.

The strain relief slots may be configured as filter elements by restricting fluid openings with mesh or porous elements, or by configuring the width of the relief slots themselves, sufficiently to restrict the size of sand, particulates, or other debris from traversing the filter elements. Further filter elements may be provided in the liner. E.g., by openings with mesh or porous elements or by narrow openings such as axial slots with controlled opening widths.

Fluid may be recovered or delivered through these filtering non-axial strain relief slots and/or through other filter elements while withstanding compression in subterranean locations. E.g., the fluid may comprise an aqueous fluid, fluid sulfur, and/or a hydrocarbon comprising one or more of heavy oil, very heavy oil, bitumen from "oil sands", shale oil, pyrolysis oil, and/or synthesis oil, such as result from heating, pyrolyzing, cracking, upgrading, and/or gasifying and synthesizing fluid in an underground hydrocarbon resource.

BRIEF DESCRIPTION OF THE DRAWING(S)

These and other features, benefits and advantages of the present disclosure will become apparent from the following description of the disclosure and the appended claims, which refer to the accompanying drawings, wherein like reference numerals refer to like features across the several views, and wherein:

FIG. 1 Strain relief liner in perspective with non-axial relief slots and offset axial filter slots.

Figure 2:
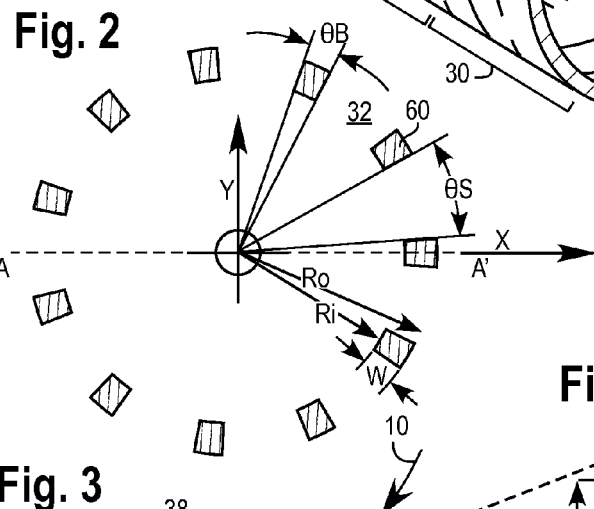

FIG. 2 End view cross-section of strain relief liner in a plane normal to the strain relief.

Figure 3:
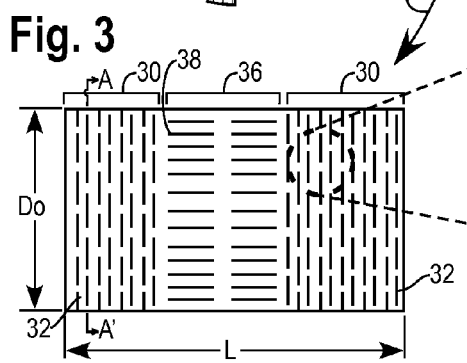

FIG. 3 Plan view of strain relief liner with circumferential relief slots and aligned filter slots.

Figure 4:
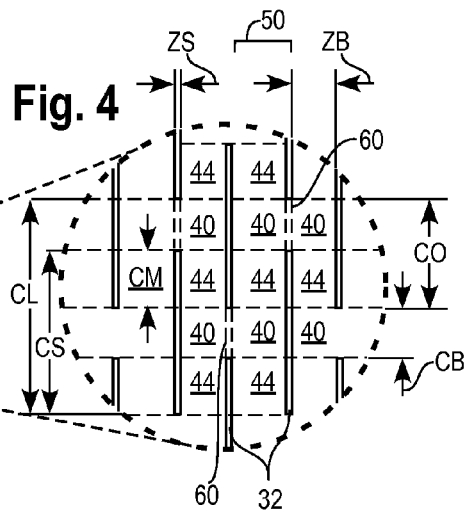

FIG. 4 Plan view (or "flattened") detail of circumferential strain relief slots in thermal liner.

FIG. 5 Schematic thermal liner plan view with chevron strain relief and mesh filter sections.

FIG. 6 Tubular end elevation of inwardly opening trapezoidal filter slot.

FIG. 7 Strain relief liner side elevation of rectangular non-axial strain relief slot.

FIG. 8 Laser cutting slots

FIG. 9 Perspective of helically wound strain relief liner with spacers.

FIG. 10 Plan view of helical strain relief section.

FIG. 11 Detail of helical strain relief liner section with spacers.

FIG. 12 Cross section strain relief rods with a spacer in an axial-radial plane.

Figure 13:
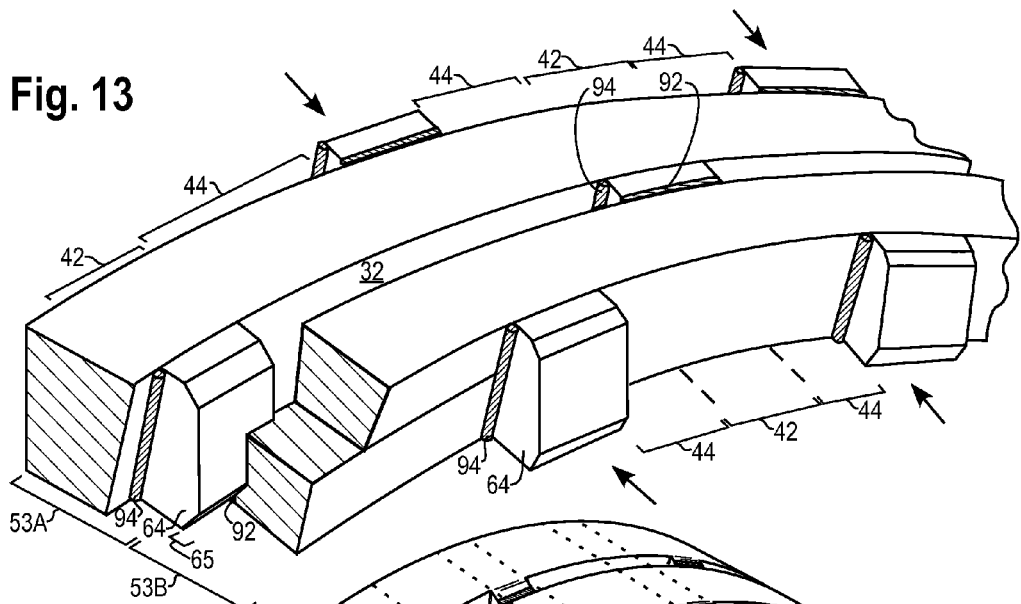

FIG. 13 Perspective detail of trapezoidal strain relief rods with bonded outdents.

Figure 14:
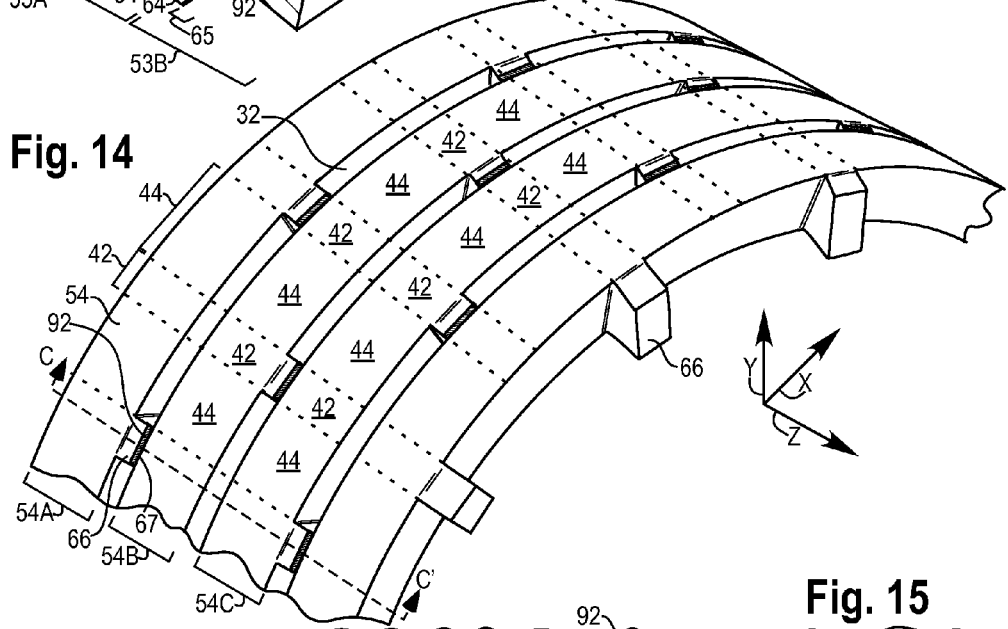

FIG. 14 Perspective detail of patterned rod strain relief liner with indents and outdents.

Figure 15:
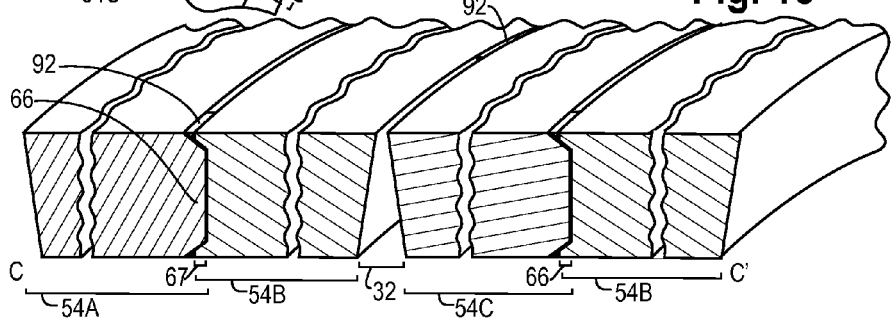

FIG. 15 Strain relief liner elevation cross section detail of patterned rod indents and outdents.

Figure 16:
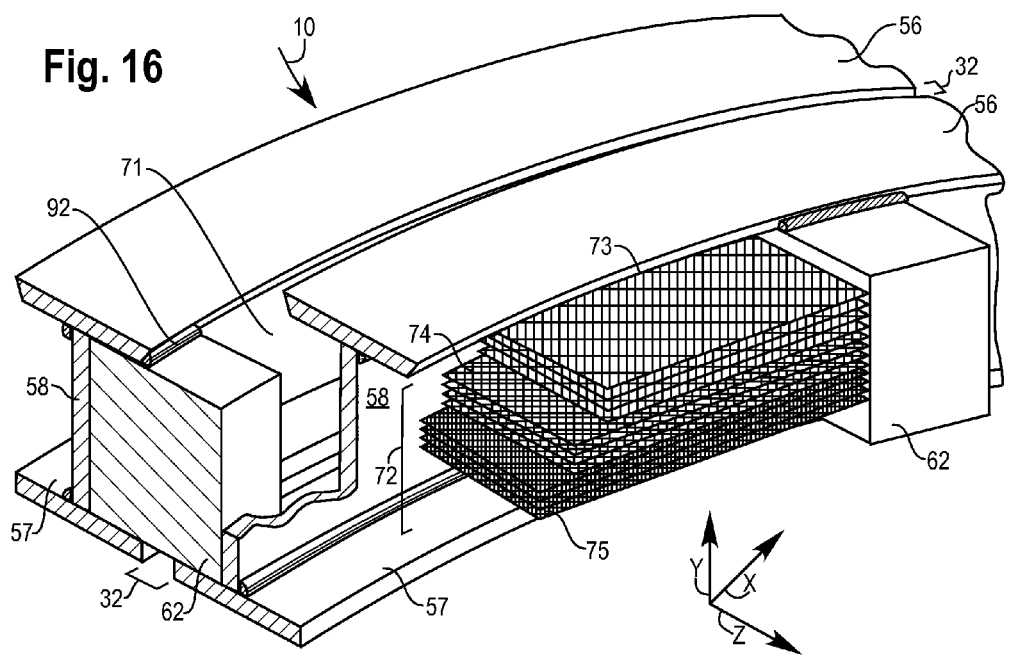

FIG. 16 Perspective detail of assembled I-Beam strain relief rods with graded filter media.

Figure 17:
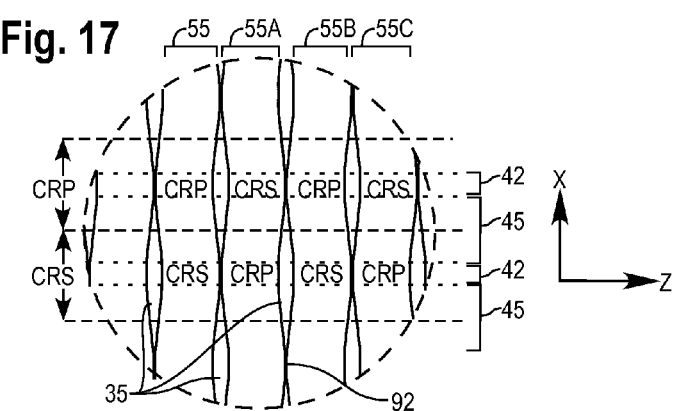

FIG. 17 Schematic plan view of a transversely corrugated rod strain relief liner.

Figure 18:
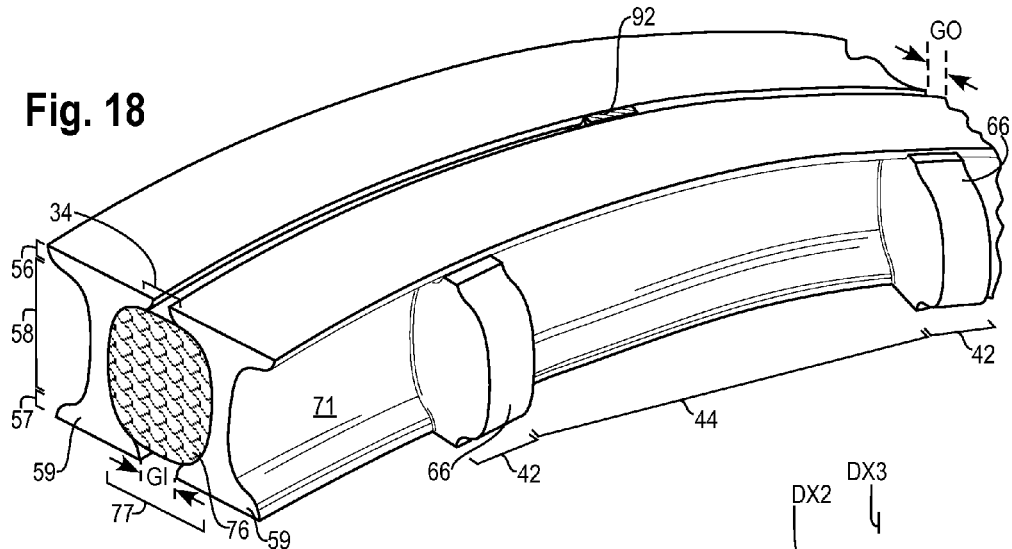

FIG. 18 Perspective detail of patterned I-Beam strain relief rods with plug filter media.

Figure 19:
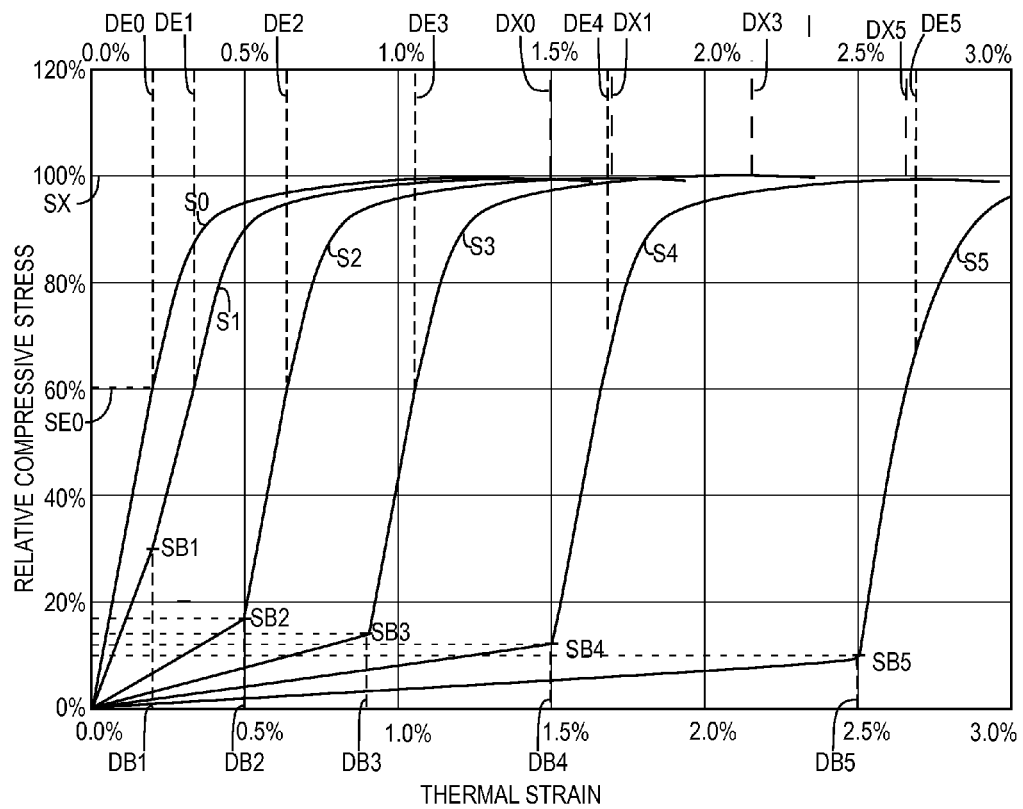

FIG. 19 Schematic stress-strain patterns for strain relief embodiments versus prior art.

Figure 20:
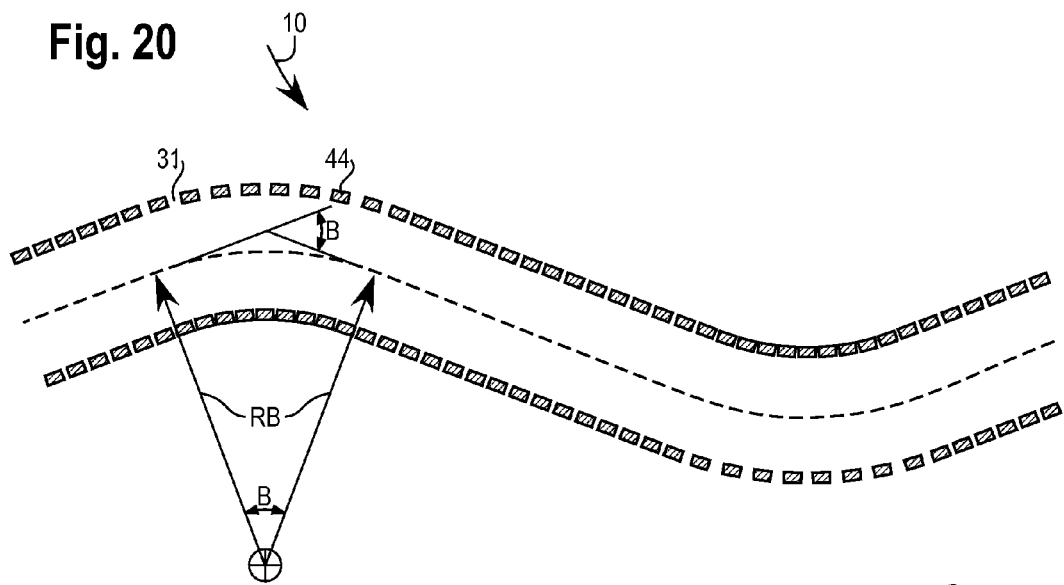

FIG. 20 Schematic elevation section of strain relief liner with bends.

Figure 21:
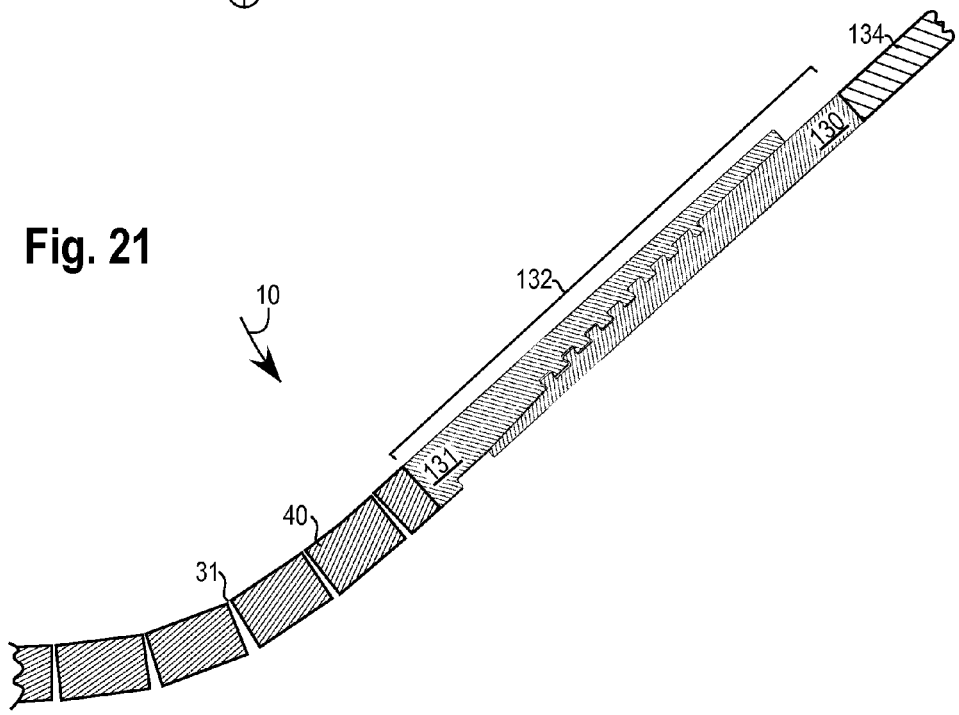

FIG. 21 Schematic elevation section of strain relief liner wall with coupling.

DETAILED DESCRIPTION OF EMBODIMENTS OF THE INVENTION

In embodiments of the invention, thermal strain relief liners are configured with a plurality of overlapping non-axial slots to provide strain relief. These non-axial strain relief slots may be configured azimuthally or circumferentially around the liner. They may be similarly be configured in an angled, helical, or other non-axial orientation. These non-axial slots provide for fluid transfer across the liner. The width of these non-axial slots may be configured to filter out particulates larger than a prescribed size. Further filter elements may also be provided in the thermal liner. E.g., axial slots or filter sieves comprising mesh or porous filtering media.

Referring to FIG. 1, in one embodiment, a strain relief tube or thermal liner 10 may be configured with a strain relief band 30 comprising a plurality of non-axial relief slots configured through the wall of tube 20 to provide strain relief. E.g., in some embodiments, the plurality of non-axial relief slots may be configured as azimuthal relief slots 32 cut through the liner wall oriented azimuthally around the circumference of tube 20 about the liner axis Z. A plurality of filter elements may be provided in a band or filter slot group 36 along the liner 10. E.g., such filter elements may comprise axial slots 38, filter sieves or other methods of transferring fluid while filtering particles.

FIG. 3 shows plan view detail of a circumference (flattened to the "XZ plane") of the portion band of strain relief slots 30 of the strain relief liner 10 such as shown in FIG. 1. Liner 10 may include a band 36 of axial slots 38. Axial slots 38 may be offset as shown in FIG. 1, or axially aligned as shown in FIG. 3. Referring to FIG. 3, and FIG. 1, the thermal liner 10 having a length L and outer diameter Do may be configured with a plurality of strain relief bands 30 comprising multiple rows of non-axial strain relief slots. E.g., shown as circumferential or azimuthal strain relief slots 32 in FIG. 1 and FIG. 3. Thermal liner 10 may comprise one or more bands or groups 36 of filter elements. E.g., shown as axial filter slots 38 in FIG. 1 and FIG. 3.

Materials: Some embodiments of strain relief liners may utilize mild to high strength steel alloys comprising H-40, K-55, L-80, C-95, J55, P10, or PS80 steels.

Referring to FIG. 2, in an end elevation of tube 10 taken through a cross section from A to A' corresponding to the cross section A to A' shown in the FIG. 3 plan view of a thermal liner configuration. The thermal liner in this configuration has a wall thickness W with an inner radius Ri and outer radius Ro, with first transverse or horizontal axis X and second transverse or vertical axis Y. Slots 32 are shown as slots subtending an angle Theta S from the tube axis. Slots 32 are separated by separator or bridge sections 60 subtending an angle Theta B from the tube axis.

FIG. 4 shows a detail section of FIG. 3, of the azimuthal slots 32 in the non-axial slot band 30. This band 30 is shown as comprising slots 32 of circumferential length CS and axial width ZS interspersed by spacer or bridge sections 60 of circumferential length equal to the base length CB and with axial width ZS. These bridges 60 and slots 32 may be configured to separate multiple rows 50 of bending members 44 and bases 40 axially spaced along the liner. Slot 32 of length CS and bridge 60 of circumferential length CB together form a repetition length CL. The plurality of slots 32 form elongated bending members 44 adjoined and supported by bases 40 forming an equivalent elongated member or rod 50. The elongated bending members 44 and base sections 40 have an axial width ZB equal to the axial separation of slots 32.

The spacers or bridges 60 are configured between axially adjacent bases 40. Neighboring bridges 60 may be circumferentially offset by greater than the circumferential bridge length or equivalent base length CB so that neighboring bridges do not overlap. Similarly, slots 32 in one row may be offset circumferentially from the next row by a circumferential distance or slot offset CO equal to the sum of circumferential length CB of bridge 60 or base 40, and circumferential length CM of adjacent elongated bending member 44.

In some configurations, the slot offset CO may be configured between 10% and 90% of the circumferential repetition length CL. In other configurations, the slot offset CO may be configured between 25% and 75% of circumferential repetition length CL. In further configurations, the slot offset CO may be configured between 40% and 60% of circumferential repetition length CL. The slot offset CO may be configured about equal the base length of the base 40 plus the length CM of the bending member 44. I.e., slot offset CO about 50% of the circumferential repetition length CL.

To provide axial strain relief, the circumferential slot length CS may be configured to be greater than the base length CB. In some configurations, the base length CB of base 40 and of bridge 60 may be configured from 2% to 98% of bending member length CM. In other configurations, the base length CB of base 40 may be configured from 5% to 90% of the circumferential bending member length CM. Further configurations the base length CB may be configured from 10% to 70% of the circumferential bending member length CM.

Axial slot width ZS of Azimuthal relief slot 32 may be configured to be less than a prescribed slot width (ZSP) to control a minor portion of the cumulative size distribution of the sand or particulates in the surrounding subterranean resource.

In some configurations, the number of strain relief slots (NS), along a line in the wall parallel to the axis, may be selected such that the net relief fraction (FR) (or ratio (SZSL) of the sum (SZS) of slot axial widths ZS to the non-gap length (NL) of liner having length L is greater than a prescribed relief fraction. Here the non-gap length (NL) is the sum of axial non-gap widths of bases and bridges along a line in the wall parallel to the axis. In configurations using uniform slots, the sum of slot widths (SZS), along a longitudinal line in the wall parallel to the axis, may equal the number of slots (NS) times the axial slot width (ZS). (The gross relief fraction is the ratio of the longitudinal sum of axial slot widths to the gross liner length L.)

In some configurations, the relief fraction (FR) may be selected at greater than the total unconstrained thermal expansion or strain (EsT) under maximum design temperature increase, less a prescribed design strain (EsD) limit. In some configurations this elastic design strain limit (EsD) may be prescribed to not exceed the elastic stress design limit (EsE). I.e., the relief fraction (FR) may be configured to accommodate the strain that would otherwise cause substantial plastic strain.

Strain Relief Design: FIG. 19 and Table 1 show schematic stress strain curves for several strain relief liner embodiments S1, S2, S3, S4 and S5. These schematically demonstrate nominal values for combined axial and radial resource compressive stress and strain for in situ heated strain relief liners compared to a schematic prior art slotted liner configuration S0. In the typical prior art example S0, the stress-strain increases approximately linearly to a design elastic stress SE0 at a design deformation DE0. E.g., S0 shows a design strain DE0 of about 0.2% at a design elastic stress SE0 set at about 60% of the maximum sustainable stress SX (100%). Further deformation may cause substantial nonlinear plastic deformation E.g., until a critical or maximum sustainable stress SX is reached at a critical deformation DX0. As shown in FIG. 19, DX0 may have a typical strain of about 1.2%.

TABLE 1

Stress-Strain Design for Some Configurations

| Configuration | SB Stress at Gap Closure | DB Strain at Gap Closure | DE Elastic Design Strain | FR Relief Fraction | Growth*/ Gap | Collapse Strain DX |
|---|---|---|---|---|---|---|
| S0 | NA | NA | 0.20% | NA | NA | 1.2% |
| S1 | 20% | 0.2% | 0.33% | 0.13% | 294% | 1.4% |
| S2 | 17% | 0.5% | 0.64% | 0.44% | 134% | 1.6% |
| S3 | 14% | 0.9% | 1.06% | 0.86% | 58% | 2% |
| S4 | 12% | 1.5% | 1.65% | 1.45% | 34% | |
| S5 | 10% | 2.5% | 2.7% | 2.5% | 20% | |

*Growth = elastic thermal expansion at design temperature increase.

In strain relief embodiment S1, bending members forming strain relief slots first bend until they reach a bending design stress of SB1 at an elastic design deformation DE1 as depicted in FIG. 19. E.g., one exemplary configuration S1 may have a design bending deformation DB1 at gap closure at a design bending stress SB1 of about 20% of the maximum sustainable stress SX in this configuration. With further thermal expansion and axial compression, the strain relief slot closes and bending deformation relief changes to axial compressive deformation. In FIG. 19, the stress-strain curve of embodiment S1 is schematically shown to rise to a design stress similar to SE0 at an axial design deformation DE1. E.g., in the configuration S1 shown, design strain DE1 may be configured at about 0.33% compared to about 0.2% for DE0 for a similar elastic design stress. The sum of all gap closures by member bending, along a line in the wall parallel to the liner axis, provides a strain relief fraction (FR) of 0.13% of total non-gap liner length. E.g. of the sum of axial widths of base members plus bridges. The deflection DX1 at that critical stress SX may be substantially higher. E.g., the critical deflection DX1 may be about 1.7% or higher compared to DX0 of about 1.5% in the relevant art.

Some configurations may accommodate a strain relief capacity equal to or greater than 0.4% of the non-gap liner length. Some configurations may provide strain relief capacity equal to or greater than the unconstrained thermal expansion of non-gap liner length. For example, in strain relief configuration S2 depicted in FIG. 19, the design bending strain DB2 with strain relief slots may be configured for about 250% of the design compressive strain DE0 without strain relief slots, for a given design bending stress SB2. E.g., the design bending strain DB2 of about 0.5% for a bending stress SB2 of about 17% of the critical stress SX. In this configuration, the strain relief slots close at about 0.5% strain, such as may typically experienced in oil sands SAGD or CSS liners. Increasing the stress to SE0, at 60% of the critical stress SX, may increase the design strain a further 0.14% to a 0.64% design strain DE2, compared to 0.2% design strain DE0 in conventional liners, for a relief fraction (FR) of 0.44%. Configuration S2 can accommodate 0.4% thermal strain below elastic design stress SE0 such as SAGD. S2 can elastically accommodate most of 0.5% thermal strain, with a little plastic deformation.

In another configuration S3, the design bending deformation DB3 may be set at about 450% of the unconstrained design deformation without strain relief slots. e.g., with a bending deformation DB3 of about 0.9% at a bending stress of SB3 of about 13% of the critical stress SX, compared to an elastic deformation DE0 of 0.2% without strain relief slots. This gives a design strain DE3 of 1.06% at design stress SE0 for a strain relief fraction (FR) of 0.86 of axial gap width, to axial non-gap widths. E.g., in this configuration, the strain relief slots at about a 0.5% pipe compression may be reduced by member bending to an axial width of about 54% of the unstrained relief slot axial width.

In another configuration shown as S4, the design bending deformation may be configured at about 750% of the design deformation without strain relief slots. e.g., with a bending deformation DB4 of 1.5% at a bending stress of SB4 of about 12% of critical stress SX at slot closure. Then the elastic design strain DE4 at a design stress SE0 of 60% of maximum stress may be nominally configured at about 1.65%, compared to an elastic deformation DE0 of 0.2% without strain relief slots. In this configuration, the strain relief slots forming 1.5% of the total axial length at closure may only need to be reduced on bending to about 33% of the unstrained strain relief slot size to accommodate a thermal strain of 0.5%. This enables configuring numerous slots with a slot width suitable for filtering particulates. E.g., such slot widths would vary from 100% to 67% of the cold filter slot width when providing an axial strain relief (FR) of 0.5%.

In another configuration shown as S5, the design bending deformation may be configured at about 1250% of the design deformation without strain relief slots. e.g., with a bending deformation DB5 of 2.5% at a bending stress of SB5 of about 10% of critical stress SX at slot closure. Then the elastic design strain DE5 at a design stress of 60% of maximum stress SX may be nominally configured at about 2.7% or 1350% of the elastic deformation DE0 of 0.2% without strain relief slots. In this configuration, the axial strain relief slot width of 2.5% of the total length at closure (or FR) may only need to be reduced on bending to about 20% of the unstrained strain relief slot size to accommodate an axial thermal strain of 0.5%. This enables configuring numerous slots with a slot width suitable for filtering particulates. Such slot widths might vary from 100% of the cold filter slot width to about 80% on thermal heating.

In configurations SB2, SB3, SB4, and SB5, the respective deflections DX2, DX3, DX4 and DX5, at the critical relative stress SX, may be configured larger than the deflections DX0 and DX1 of configurations S0 and S1.

FIG. 19 and Table 1 show further configuration where bending members and slots may be configured to provide various degrees of strain relief. These configurations are selected to nominally close the slot gap by member bending with a stress SB of 20% for S1, 17% for S2, 14% for S3, 12% for S4 and 10% for S5 as examples. These configurations have a strain (DB) at gap closure shown as a bend in the stress strain curve. E.g. configuration S1 with 0.33% design bending DB1 at gap closure; S2 with 0.5%, S3 with 0.9%, S4 with 1.5%, and S5 with 2.5% strain relief at design bending. These configurations have an elastic design strain of 0.33% for configuration S1, 0.64% for S2, 1.06% for S3, 1.65% for S4 and 2.7% for S5 compared 0.20% for the prior art configuration S0 without strain relief.

Configurations S3, S4 and S5 show configurations in which the net relief fraction (FR) of the sum of the axial widths of non-axial slots to non-slot widths (bases plus bridges) along a line in the wall parallel to the axis may be greater than the unconstrained design thermal expansion fraction of the non-slot wall length along that line over a prescribed operating temperature difference. E.g., the growth/gap ratio of configuration S3 is an example of configuring the bending members so that the cumulative axial closure of non-axial slots at the design temperature is less than 58% of the cumulative axial cold width of slots of the unheated liner.

In another configuration, the bending members may be configured to provide 0.20% strain relief at design bending. This may provide a strain relief fraction (FR) of 50% of a total strain of 0.4%. It may provide strain relief of 40% of a total strain of 0.5%. This 0.2% strain relief would provide 100% of the strain above the 0.2% elastic design level in configurations having 0.4% total strain. In liner having 0.5% total thermal strain, this strain relief would similarly provide 67% of the 0.3% strain above the design strain of 0.2%.

In further configurations, the bending members may be configured to accommodate thermal strain of 0.15%. E.g., this may provide a strain relief fraction (FR) of 38% of a total thermal strain of 0.4%. With an elastic design strain of 0.2%, such a strain relief configuration would accommodate up to 0.35% strain or 75% of the thermal strain in excess of the elastic design level DE0 at SE0.

Referring to FIG. 5, in some configurations the band 30 of strain relief elements with non-axial slots may comprise a plurality of angled strain relief slots 33 configured to provide axial strain relief. Angled strain relief slots 33 may overlap enabling axial strain relief on thermal compression. The thermal liner may further comprise filter elements.

Filter sieves: Referring to FIG. 5, the strain relief liner may comprise a filter band 36 having a plurality of filter sieves 39. These filter sieves may be configured as circular or elliptical disks. E.g., Filter elements may comprise mesh or porous filter sieves 39 having flexible mesh, sintered mesh, or porous filter media to filter particles from entering the strain relief liner.

Referring to FIG. 6, some configurations comprise non-axial slots 31 that may be formed having a gap with inner width GI and outer width GO. Configurations may use an inverted "keystone" shape with inner slot width GI being greater than outer slot widths GO, with a half angle B describing the slope of the outer edge of the gap. E.g., inner slot width GI may be more than 105%, 110%, or more than 120% of outer slot width GO. Non-axial filter slots 31 may be formed in a similar shape. The thickness W of the tube wall 20 or corrugated winding from inner radius Ri to outer radius Ro may be configured to provide the compressive strength needed to withstand the radially inward underground resource compressive pressure. (See also wall thickness W in FIG. 7, and FIG. 8)

Referring to FIG. 7, in some configurations non-axial slots 31 may be configured in wall 20 having width W with a rectangular strain relief slot 31. E.g., non-axial may include angled slots 33 in FIG. 5 and azimuthal slots 32 in FIG. 1. In other configurations strain relief slot 31 may be configured with an inward opening "keystone" shaped slot. E.g., with the inner width being greater than 110% of the outer width.

Rod-Spacer Liner: Referring to FIG. 9, in another thermal liner embodiment, the bending members and interspersed base regions may be formed by winding an elongated member or rod 50 into a strain relief liner 10 with a bridge or spacer 62 positioned between adjacent windings at multiple points around the circumference. These form a slotted strain relief liner 10 comprising non-axial helical slots 34 formed by the adjacent windings 50 separated by the spacers 62.

In a similar fashion, some configurations may form circular sections and separate these by spacers. As described above the spacers may be bonded between adjacent windings. E.g., spacers may be bonded periodically along the elongated material. Then adjacent windings may be bonded along the spacers on the outer and/or inner radius. FIG. 10 shows a plan view of a helical strain relief tube 10 having a diameter Do and length L with a group 30 of helical non-axial relief slots 34.

Helically Slotted Liner: As depicted in FIG. 9, in one embodiment a non-axial slot 34 may be formed in tube 20 by forming a helical elongated slot 34 in the tubular wall 20. E.g., the helical slot 34 may be formed by helically cutting tube 20. Referring to schematic FIG. 8, a laser system 100 with a laser focuser 102 may be used to focus laser beam R1 to R2 with a focal length FX with a half angle B to a focal point FP at an offset E from the wall 20 of width W. The focal length FX and offset E may be adjusted to cut non-axial slot 31 with a desired gap with outer width GO and inner width GI.

FIG. 11 shows a detail view of the helical slotted tube of FIG. 9 with a plurality of wound rod sections 50 separated by a plurality of interspersed bridges or spacers 62. Each spacer 62 may be bonded to one or both adjacent base sections 40 of rod 50 by one or more bonds 92. E.g., by welding, soldering, brazing or adhesively bonding. Some configurations provide a plurality of bonds 92 bonding spacers 62 to and between base sections 40. These spacers 62 and base sections 40 form intermediate bending members 44.

FIG. 12 shows an elevation cross section B to B' of the helical slotted tube in an axial-radial Z-Y plane as noted in FIG. 11. A trapezoidal spacer 62 may be bonded between trapezoidal rods 20 by bonds 92 to form relief slot 34. These bonds 92 may be formed azimuthally as shown in FIG. 11 and FIG. 12. Spacers 62 may be bonded by bonds 94 which may be configured nominally radially. Both azimuthal bonds 92 and nominally radial bonds 94 may be used.

Transversely Corrugated Wound Liner: Referring to FIG. 17 showing a plan view of a corrugated liner, in one embodiment, corrugated strain relief slots 35 and strain relief bending members 45 between base sections 42 may be configured by transversely forming or corrugating an elongated member or rod into a transversely corrugated rod or winding 55. In some configurations major corrugations may be formed on the port and starboard side of the corrugated rod 55, when viewed in the azimuthal winding direction tangential to the strain relief liner 10 (normal to the liner radius and axis). In one configuration, a set of major port corrugations CRP or starboard corrugations CRS may comprise deviations to one side of 25% to 75% of the rod length in corrugated rod 55A. The complementary set of starboard corrugations CRS or port corrugations CRP comprise a complementary portion of the corrugated rod 55B. A further complementary corrugated rod 55C is shown adjacent to 55B. A portion of the rod 55 may be uncorrugated between port corrugation CRP and starboard corrugation CRS.

Referring to FIG. 17, in further configurations, the corrugated winding or rod 55 may have minor corrugations to one of the port side CRP and the starboard side CRS of the winding as it is formed. (E.g., the port or starboard corrugations comprise less than 25% of the rod length.) The winding may then be wrapped to form a tubular strain relief liner with non-axial slots. E.g., with corrugated relief slots 35. In some configurations, the windings may be helically wrapped to form a tubular strain relief liner with helical corrugated strain relief slots 35. In other configurations, the windings 55 may be cut to form parallel azimuthally circumferential strain relief ring sections comprising bending members 45. These may then be formed into a tubular strain relief liner 10 with rings forming corrugated strain relief slots 35. The portion of the rod that is corrugated and the slot width may be adjusted to provide a prescribed thermal strain relief.

In one embodiment, the corrugated winding or rod 55 comprises a non-integral number of corrugation cycles forming the circumference of the tubular strain relief liner. In some configurations, the corrugations may be spaced along the corrugated rod winding 55 such that the corrugations in one corrugated rod winding 55A are generally "out of phase" with corrugations in the adjacent corrugated rod winding 55B. A third winding 55C may be similarly "out of phase" with the second corrugated rod winding 55B. In this way, a port corrugation CRP (or starboard corrugation CRS) in one winding may be aligned with and contact one of: a non-corrugated portion, and an opposing starboard corrugation CRS (or port corrugation CRP) in the adjacent winding.

E.g., in the configuration shown in FIG. 17, a starboard corrugation CRS in a first corrugated rod winding 55A may contact a port corrugation CRP in a second corrugated rod winding 55B. Correspondingly, the port corrugation CRP in the first corrugated rod winding 55A may align with the starboard corrugation CRS in the second corrugated rod winding 55B, forming a corrugated relief slot 35. In another configuration, a starboard corrugation CRS in a first corrugated rod winding may contact a non-corrugated portion in the adjacent winding. Such differing phase in port/starboard alignment between adjacent windings of corrugated rods 55A, 55B, and/or 55C may take the intervening winding between corrugations and forms it into bending members separated by slots, which provide axial strain relief.

The portions of adjacent windings that touch may be bonded to form a connected strain relief liner from the windings. This may be done by welding, brazing, or soldering the connections, or by providing high temperature adhesive, as is known in the art. E.g., by welding along the adjoining windings on the inner and outer radius with a fiber laser.

Shaped rods with bonded spacers: Referring to FIG. 13, in some configurations, shaped outdent spacers 64 may be bonded with generally radial bonds 94 to respective base portions 42 of an axially first side of a first rod 53A and respective base portions 42 of second rod 53B etc. The rods 53A and 53B may be formed into a helical or circular winding (s). The outdent spacers 64 may be spaced along wound rods 53A and 53B etc in non-integral multiples per liner circumference. I.e., when rod 53A is wound adjacent to rod 53B, the outdents on rod 53A may be configured so as to be offset from and to not align with outdents on adjacent rod 53B. The outdent spacers 64 and corresponding base portion 42 in rod 53B may be offset from and positioned between corresponding outdent spacers 64 and base portion 42 in rod 53A.

This offset spacing of outdent spacers 64 forms bending members 44 in the rod member 53A between base portions 42. The spacing of outdent spacers 64 similarly forms a bending member 44 between base portions 42 on the adjacent wound rod 53B. This method may apply both to cylindrical rods and to helically wound rods 53A and 53B.

Concave Indents & Rod Alignment: Referring further to FIG. 13, in some configurations, the convex outdent spacers 64 on rod 53A may be configured to align with one or more concave indents 65 formed in adjacent rod 53B. In some configurations, indents 65 may be configured by forming or rolling one side of rod 53B into a concave shape generally complementary to the convex shape of outdent spacer 64 bonded to rod 53A.

In some configurations, rods 53A and 53B etc are wound into a strain relief liner having outdents 64 and adjacent indents 65 to provide radial self alignment under compressive stress in the strain relief liner from thermal temperature expansion.

In some configurations, indents 65 may be formed in rods 53B complementary in shape to outdents 64 in rod 53A. E.g., sufficient to provide azimuthal alignment and to provide torsional strength about the liner axis via the shear strength of the overlap between outdents 64 and indents 65. In other configurations, indents 65 may be formed with a concave shape in two dimensions in provide both radial and azimuthal alignment with convex outdents 64.

In some configurations, outdents 64 on the first rod 53A may be bonded to the adjacent rod 53B. E.g., with azimuthal bonds 92 or similar radial bonds 94 configured along adjacent surfaces between outdent 64 and rod 53B. Other helical or cylindrical windings may similarly comprise bonded outdents 64 and be bonded to corresponding windings.

Patterned alignment: Referring to FIG. 14, in some configurations, the strain relief liner may be formed by cylindrically or helically winding a patterned rod 54 comprising convex outdents 66 and complementary concave indents 67. E.g., the outdents 66 and indents 67 may be configured such that patterned rods 54 of adjoining windings are complementarily dimpled or indented with indents 67, and formed or outdented with outdents 66, in one of the port or starboard axial directions relative to viewing azimuthally down the winding.

This dimpling or patterning may be done in one or more spacer locations around the strain relief liner. This dimpling may be configured to provide a radially self aligning feature to provide radial alignment between adjacent windings 54A and 54B. In some configurations, the dimpling may provide azimuthal (tangential) alignment between adjacent windings 54A and 54B. In some configurations, the dimpling may be in the form of a "tongue" 66 in "grove" 67 configuration between adjacent windings at the spacer locations. In some configurations, the dimpling may be in the form of an elliptical outdentation 66 and indentation 67. In further examples, tooth type outdents 66 on one side of the winding may be complemented by socket type indents 67 on the other side of the winding.

Outdents 66 on rod 54A may be bonded to rod 54B with bonds or welds 92 in some configurations.

Patterned Trapezoidal Rod Liner: A cross section C to C' through patterned trapezoidal rods 54A, 54B and 54C in FIG. 14 is shown in FIG. 15. A first patterned rod 54A may be configured with an outdent 66 that fits into an indent 67 in an adjacent second patterned rod 54B. The outdent 66 of rod 54A may be bonded to rod 54B at an indent 67 with a bond 92. E.g., by one of welding, soldering, brazing, and adhesively bonding. The outdents 66 may provide supporting base portions 42 for intermediate bending members 44 of FIG. 14. The outdents 66 and indents 67 may be configured to provide radial alignment of adjacent patterned rods 54A and 54B. The outdents 66 and indents 67 may be configured to provide alignment and support torsional stress in the circumferential or azimuthal direction X along the rods 54A and 54B. As shown in FIG. 15, the azimuthal sides of rods 54A and 54B may be configured with slanted sides to collectively form a trapezoidal or "keystone" shaped slot 32 that is narrower on the radial exterior and wider on the radial interior. E.g., to facilitate sand filtering without filling the filter slot.

Slot filter size control: In some configurations, the slotted portions of one or both slot sides of the adjacent windings may be formed into an inward expanding wedge slot with a narrower slot opening at the outer radius Ro, and a wider slot opening at the inner radius Ri. The outer slot opening may be configured to screen off a prescribed major portion of sand from the resource from entering the strain relief liner. E.g., this may be configured to exclude particles 90% greater than one of 80 microns, or 200 microns, or 500 microns.

I-Beam winding with graded filter media: Referring to FIG. 16, one embodiment may wind a strain relief liner 10 using I-beam type composite filter rods comprising an outer flange element 56 formed with or bonded to a radial web element 58 which may be formed with or bonded to an inner flange element 57. These composite filter rods may be wrapped azimuthally to form a strain relief liner using helical or circular wraps. Adjacent composite filter rods may be connected by slot spacers 62. The slot spacers 62 may be held in place by friction fit, or may be bonded with bonds 92 to one or both of the outer and/or inner flange elements 56 and 57.

Filter Size control: Referring further to FIG. 16, slot spacers 62 may be sized relative to widths of outer flanges 56 to configure azimuthal relief slots 32. Slot spacers 62 may be sized to control width of relief slots 32 to exclude resource particulates sized larger than a prescribed minor portion of the cumulative particle size distribution. E.g., all particulates greater than one of 0.3%, 1%, 3%, and 10% of the cumulative size distribution. In some configurations, filter media 72 may be positioned in the filter cavities 71 formed between adjacent webs 58, adjacent spacers 62 and inner flanges 57 and outer flanges 56 to form a strain relief liner 10. In some configurations, filter media 72 may comprise a plurality of filter mesh layers which may be have a gradation in filter size. The mesh size of the filter mesh layers 72 may be configured to exclude one of particles larger than a first particle size (D1) in an outer filter layer 73, to exclude particles larger than a second particle size (D2) in an intermediate filter layer 74, and to exclude particles larger than a third particle size (D3) in an inner filter layer 75. E.g., a coarse mesh filter 73 may be positioned on the outer radius, then a medium mesh filter 74, and then to fine filter mesh 75 on the inner radius. E.g., the filter layers may be configured with (D1) greater than (D2) which in turn may be configured greater than (D3).

Patterned Strain Relief Filter Liner: Referring to FIG. 18, in some embodiments the elongated member may be impressed with a pattern forming a filter patterned rod 59 comprising a pressed slot tooth or outdented spacer 66, forming strain relief bending members 44 between outdented spacers 66, and a plurality of filter cavities 71 to hold porous filter media 76 and form a filter section 77. The filter patterned rod 59 cross-section may be formed in a generally hourglass or I-beam shape. The I-beam shape may be formed by an outer flange portion 56 wider than an inner flange portion 57 joined by a radial web portion 58. The width of the spacer 66 relative to the flange portions 56 of adjacent rods 59 form the outer width GO of slot 34. Similarly, the width of spacer 66 relative to the inner flange portions 57 of adjacent rods 59 form the inner slot width GI of helical filter slot 34. Spacer 66 may comprise an upper spacer separating outer flange portions 56 and an inner spacer separating inner flange portions 57.

Multiple rods 59 may be configured such that two adjacent filter patterned rods 59 form a filter cavity between them to sufficient to hold porous filter media 76. This porous filter 76 may comprise one of fiber wool, wire mesh, coarse particulates or sand, or porous sintered media, where the porous filter may be formed of one of metal, glass, or ceramics. The filter media size or porosity may be configured sufficient to filter off particulates greater than a minor prescribed portion of the cumulative size distribution of the hydrocarbon resource particulates.

The axial portion (GZ) of the strain relief slot is the axial portion of the smaller of inner width GI and outer width GO. The cumulative or total axial slot width (GZT) may be evaluated. E.g. with uniform slots, GZT may be evaluated as the number of relief slots (NS) times the axial portion (GZ) of the relief slot width. In some configurations, the relief slots may be configured such that the cumulative or total portion (GZT)

is greater than a prescribed gross relief fraction of the length L of the slotted strain relief liner.

Transverse Liner Bending: Referring to FIG. 20, the strain relief liner 10 may be configured to provide bending strain relief. E.g., on differential transverse displacement by the surrounding resource. Thermal liner embodiments described herein may be configured with a plurality of overlapping non-axial slots. E.g., one or more of the strain relief liner configurations as shown in FIG. 1, FIG. 5, FIG. 9, FIG. 13, FIG. 14, FIG. 16, FIG. 17, and FIG. 18. Such non-axial overlapping slots may provide relief in bending of the liner tubular.

With reference to FIG. 20, bending may be accommodated in a strain relief liner by non-axial slots 31 between bending members 44 opening on the outer radius of the strain relief liner bend, while being compressed on the inner radius of the strain relief liner bend. In configurations having bending strain combined with thermal strain, thermal axial strain may partially close the non-axial slots 31 on the outer radius of the bend to open less with heating relative to the unheated bent strain relief liner. Correspondingly, the non-axial strain relief slots on the inner radius of the strain relief liner bend may be close more or close and experience compressive strain as liner thermal strain increases. As shown in FIG. 20, the strain relief liner may accommodate a plurality of bends due to shifting of the resource.

The non-axial slot spacing and number of non-axial slots may be configured to allow the tubular axis to bend by an angle B about a radius RB. In some configurations, the strain relief liner may accommodate a bend of about five degrees. In further configurations, the strain relief liner may bend by about 10 degrees, or 20 degrees, or 30 degrees. The liner may be configured to accommodate liner bending with axial wall strain greater than 120% of the extensive or compressive design elastic strain on outer and inner bending walls. The non-axial slot width may be configured to remain less than a prescribed filter slot width in the bent configuration.

Couplings: Referring to FIG. 21, the strain relief liner 10 with a portion of non-axial relief slots 31 may comprise or be connected with a liner coupling 132. The coupling 132 may comprise an inner coupling 130 and an outer coupling 131. In some configurations, the strain relief liner 10 may have base members 40 connected to the outer coupling 131. In other configurations, the base members 40 may be connected to the inner coupling 130. In some embodiments, one end of the inner coupling 130 and outer coupling 131 of coupling 132 may be connected to a delivery tube 134.

In some configurations, the wall thickness W, circumferential length CB, and width ZS of bridge 60 and the number of bridges around the liner 10 may be configured to exceed a design torsional strength about the liner axis. This may be coupled with providing axial strain relief greater than a prescribed design strain relief, and a compressive strength greater than a prescribed compression strength to accommodate the resource.

Heating: In some embodiments, these thermal liners and the resource may be heated by one or more hot fluids including, steam, products of combustion, or hot fluid comprising one or more of hot water, steam, carbon dioxide, nitrogen, oxygen, a hydrocarbon, and sulfur. In other embodiments, the thermal liner and resource may be heated directly or indirectly by solar energy, or by electricity or electromagnetic radiation.

Generalization

From the foregoing description, a person skilled in the art will appreciate that a novel approach for providing strain relief methods and configuring thermal liners has been disclosed using one or more methods described herein. While the components, techniques, and aspects of the invention have been described with a certain degree of particularity, it is manifest that many changes may be made in the specific designs, constructions and methodology herein above described without departing from the spirit and scope of this disclosure.

Where dimensions are given they are generally for illustrative purpose and are not prescriptive. Of course, as the skilled artisan will appreciate, other suitable sizes, angles, and configurations of the bending members, bases, bridges, spacers, outdents, indents, patterns, dimples, non-axial slots, filter slots, filter cavities, filter components, couplings and other components may be efficaciously utilized, as needed or desired, giving due consideration to the goals of achieving one or more of axial strain relief, tubular bending, filtration, compressive strength, and/or torsional strength benefits and advantages as taught or suggested herein.

Where thermal liner array configurations are provided, similar configurations or combinations of those configurations may be efficaciously utilized, including varying the nominal thicknesses, widths, lengths, cross sectional shapes, spacings, orientations, offsets, overlaps, and other dimensions and parameters of the components used for forming the axial or bending strain relief, filtration, compressive support, and/or torsional strength capabilities of the strain relief liners.

Where assembly methods are described, various alternative assembly methods may be efficaciously utilized to achieve configurations and provide the benefits and advantages of one or more of the embodiments or configurations as taught or suggested herein.

Where transverse, axial, radial, circumferential, azimuthal or other directions are referred to, it will be appreciated that any general coordinate system using curvilinear coordinates may be utilized including Cartesian, cylindrical, spherical, annular or other coordinate system. Similarly, the bending members, bases, bridges, non-axial slots, filter slots, filter cavities and couplings may be generally rearranged to achieve other beneficial combinations of the features and methods described.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

What is claimed is:
1. A thermal liner with a wall comprising:
   a plurality of bending members axially separated by non-axial slots;
   a plurality of bases circumferentially interspersed between and supporting said bending members;
   a plurality of connections, each configured between pairs of axially adjacent bases and non-axially adjacent non-axial slots and comprising one of a bridge and a joint;
   wherein axially neighboring bases are circumferentially offset by a displacement CO that is greater than the circumferential base length CB, and
   are positioned adjacent neighboring non-axial slots; and wherein, over a prescribed design increase in liner temperature and along a longitudinal line in the wall parallel to the axis, the strain relief capacity, being the sum of the axial widths of non-axial slots, is greater than 0.13% of the total axial non-slot wall length.

2. The thermal liner of claim 1 comprising a helically wound rod forming a plurality of helical windings, each winding having a plurality of alternating bending members and bases, and wherein the helically wound rod comprises a plurality of bridges between bases in adjacent helical windings wherein forming the non-axial slots.

3. The thermal liner of claim 2 wherein bridges on one winding form outdents configured with complementary indents in an adjacent winding, further comprising bonds between adjacent outdents and indents, and wherein the outdents and indents overlap axially sufficient to sustain a prescribed torsional moment about the liner axis.

4. The thermal liner of claim 1 comprising a helical rod forming bending members between adjoining bases; with outdents on bases forming bridges to adjacent bases, wherein a plurality of outdents are bonded to the adjacent bases.

5. The thermal liner of claim 4 comprising an indent on one base aligned with the outdent on the adjacent base.

6. The thermal liner of claim 1 wherein the non-axial slots are configured with the radially inner slot width GI being greater than 105% of the radially outer slot width GO.

7. The thermal liner of claim 6 wherein the radially middle bending member portion has an axial width less than both the radially outer portion and the radially inner portion.

8. The thermal liner of claim 1 wherein the strain relief capacity is greater than 0.4% of the total axial non-slot wall length.

9. The thermal liner of claim 1, wherein the strain relief capacity is greater than or equal to 1.45% of the total axial non-slot wall length.

10. The thermal liner of claim 1 having bending members between non-axial slots on opposing sides of the thermal liner, wherein allowing elastic bending of the liner that is greater than 120% of the design elastic bending without non-axial slots.

11. The thermal liner of claim 1 wherein the slot offset CO is between 10% and 90% of the slot repetition length CL of the sum of the base length CB plus the slot length CS.

12. The thermal liner of claim 1 wherein the ratio of base length CB to slot length CS is between 1:1.5 and 1:20.

13. The thermal liner of claim 1 comprising a corrugated rod forming alternating bending members and bases, the rod having a plurality of alternating port and starboard corrugations when viewed along the azimuthal winding direction tangential to the thermal liner, and further comprising a plurality of bonds, each bond connecting a port corrugation base to an adjacent starboard corrugation base.

14. The thermal liner of claim 1 further comprising filter elements selected from one of axial slots, circular filter elements, and elliptical filter elements.

15. The thermal liner of claim 1 wherein the non-axial slots comprise filter cavities having filter elements.

16. The thermal liner of claim 1 wherein the non-axial slots are configured to accommodate a thermal liner axial design bending of at least five degrees, and wherein the widths of non-axial slots are configured to remain less than a prescribed filter slot width.

17. A method of forming a slotted liner, having a wall comprising a plurality of non-axial bending members axially separated by non-axial slots and circumferentially interspersed with bases, for providing strain relief, the method comprising:

forming the bending members and the non-axial slots by one of:
cutting non-axial slots, and
winding a rod;
configuring the circumferential lengths of the plurality of non-axial slots and bases relative to the liner circumference C;
wherein positioning a first base axially adjacent to a non-axial slot;
configuring the non-axial slot circumferential length CS longer than the circumferential length CB of the first base; and
positioning a second base axially adjacent to a first base;
providing connections between the pair of bases or leaving uncut the wall between the base pair;
configuring the plurality of non-axial slots and adjacent base pairs, wherein providing one of:
axial strain relief capacity greater than a prescribed portion of the liner's net unconstrained axial thermal expansion at the in-situ design operating temperature, evaluated along a line through the pair of bases parallel to the liner axis; and
bending strain relief capacity sufficient to bend the liner axis through an angle B with a bending radius RB.

18. The liner method of claim 17 wherein connecting between the first base and the adjacent second base comprises providing a bridge by one of forming an outdent on the first base, and bonding a spacer to the first base; and bonding the bridge to the adjacent second base.

19. The liner method of claim 18 wherein forming the connection comprises forming an indent in the second base corresponding to the outdent on the first base, and bonding the indent and outdent, wherein the indent and outdent provide one of radial and azimuthal alignment.

20. The liner method of claim 17 wherein connecting comprises transversely corrugating the rod with a plurality of alternating axially port and starboard corrugations, helically winding the corrugated rod; and bonding a first port corrugation on a first winding to a first starboard corrugation on an adjacent winding.

21. The liner method of claim 20 comprising configuring one of the port and starboard corrugations to comprise from 25% to 75% of the circumferential repetition length CL of the sum of port and starboard corrugation lengths.

22. The liner method of claim 17 further comprising configuring bending members to accommodate liner bending with axial wall strain greater than 120% of the extensive or compressive design elastic strain on outer and inner bending walls.

23. The liner method of claim 22 wherein configuring the strain relief slots to filter particles greater than a prescribed size.

24. The liner method of claim 17 wherein configuring the number of bending members such that the cumulative axial closure of non-axial slots at the design temperature is less than 58% of the cumulative axial cold width of slots of the unheated liner.

25. The liner method of claim 17 wherein configuring the circumferential base length CB to be between 5% to 90% of the bending member circumferential length CM.

26. The liner method of claim 17 wherein configuring the non-axial slots and bases comprises configuring the slot offset CO between axially adjacent slots to be between 10% and 90% of the circumferential repetition length CL being the base length CB plus the slot length CS.

27. The liner method of claim 17 comprising configuring the dimensions of the connections between bases to provide a torsional strength capability greater than a prescribed minimum design torsional strength.

28. The liner method of claim 17 comprising configuring the width of the non-axial slots to filter particulates greater than a prescribed particle size.

29. The liner method of claim 17 comprising configuring filter cavities with filter elements within the non-axial slots filtering elements within the non-axial slots.

30. The liner method of claim 17 comprising coupling the a liner portion with non-axial slots to a delivery tube.

31. The liner method of claim 17 wherein forming non-axial slots comprises laser cutting.

32. The method of claim 17 wherein forming the bending members comprises configuring the radial wall thickness W and bending member axial widths sufficient to withstand an in situ resource compressive pressure at the design operating temperature.

33. The method of claim 17 wherein configuring non-axial slots comprises providing an axial strain relief capacity greater than or equal to zero point one three percent (0.13%) of the net liner length.

* * * * *